(12) United States Patent
Cheatle et al.

(10) Patent No.: US 7,561,177 B2
(45) Date of Patent: Jul. 14, 2009

(54) EDITING MULTIPLE CAMERA OUTPUTS

(75) Inventors: Stephen Philip Cheatle, Bristol (GB); David Arthur Grosvenor, Frampton Cotterell (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1131 days.

(21) Appl. No.: 10/894,439

(22) Filed: Jul. 19, 2004

(65) Prior Publication Data
US 2005/0206720 A1    Sep. 22, 2005

(30) Foreign Application Priority Data
Jul. 24, 2003    (GB) ................... 0317302.8

(51) Int. Cl.
*H04N 7/14*    (2006.01)
*H04L 12/16*    (2006.01)
(52) U.S. Cl. ............... 348/14.08; 348/14.11; 348/14.01
(58) Field of Classification Search ... 348/14.01–14.16; 359/618, 630; 370/260, 261; 709/204
See application file for complete search history.

(56) References Cited

U.S. PATENT DOCUMENTS

| 5,638,114 | A | 6/1997 | Hatanaka et al. | |
| 5,835,129 | A | 11/1998 | Kumar | |
| 5,936,662 | A | 8/1999 | Kim et al. | |
| 6,349,001 | B1 * | 2/2002 | Spitzer | 359/618 |
| 6,369,846 | B1 * | 4/2002 | Katsumi | 348/14.01 |
| 6,577,333 | B2 * | 6/2003 | Tai et al. | 348/14.08 |
| 6,795,107 | B1 * | 9/2004 | Neal et al. | 348/14.08 |
| 7,113,201 | B1 * | 9/2006 | Taylor et al. | 348/14.08 |
| 2001/0026314 | A1 * | 10/2001 | Nakade et al. | 348/14.09 |

OTHER PUBLICATIONS

Search Report dated Dec. 10, 2003.

* cited by examiner

*Primary Examiner*—Melur Ramakrishnaiah

(57) ABSTRACT

Various embodiments provide a system and method for producing an edited video signal from a plurality of cameras. Briefly described, one embodiment is a method that produces an edited video signal from a plurality of cameras wherein at least the imaging lens of each of the camera being held or worn by a respective one of a plurality of participants simultaneously present at a site, comprising receiving contemporaneous audio streams from at least two participants, selectively deriving from the audio streams a single audio output signal according to a predetermined first set of one or more criteria, receiving contemporaneous video streams from at least two of the cameras, and deriving from the video streams a single video output signal according to a predetermined second set of one or more criteria.

54 Claims, 4 Drawing Sheets

EDITING MULTIPLE CAMERA OUTPUTS

TECHNICAL FIELD

Embodiments are generally related to image capture devices, and, more particularly, are related to an apparatus and method for editing the outputs of a plurality of cameras.

CLAIM TO PRIORITY

This application claims priority to copending United Kingdom utility application entitled, "Editing Multiple Camera Outputs," having serial no. GB 0371302.8, filed Jul. 24, 2003, which is entirely incorporated herein by reference.

BACKGROUND

Home video cameras are becoming more and more common, and can capture image and sound data over increasingly long periods. Recent developments indicate that wearable cameras will soon be available which are capable of recording continuously over very long periods, and it is to be expected that this in turn will lead to the capture of extended events including interactions between different people, for example a discussion between two or more people, or the telling of a tale by one person to one or more others whose expressions change as the tale unfolds.

It is known to use a single camera to record such events, as in U.S. Pat. No. 5,844,599 (Hildin), incorporated herein by reference, where the voice of an active speaker causes the camera pan and tilt to be adjusted to bring the speaker into the field of view; and in U.S. Pat. No. 5,434,617, incorporated herein by reference, where a camera tracks a person talking to an audience. However, it is not possible to switch rapidly between two or more different viewpoints in the resulting raw or edited video, and there is a single camera location. This can lead to the video becoming tedious to watch, for example if a conversation is followed from a single viewpoint. The sound quality may also be very variable when there are speakers at different distances from the camera microphone.

To add to the difficulty for the amateur user, editing of home videos is not a particularly easy process at present, and commonly the whole of the recording needs to be looked at to decide which are the interesting parts to be retained. Systems for the automated editing of outputs from single cameras are becoming available. An exemplary system is described in GB-A-2380348, incorporated herein by reference.

In principle, of course, the situation could be improved by allocating cameras to each of a plurality of participants, with the intention of manually editing the plural camera signals into a single acceptable signal at a later date. Each camera could be operated and controlled by a participant, so that for example the direction of its field of view could follow the conversation, but it is to be expected that a hand held camera could be intrusive and a nuisance to the participant to the extent that it fails to be operated correctly. Alternatively, each camera could be mounted separately from the participants, for example to view an allocated participant, but then the view obtained therefrom is always the same, and the sound quality will be inferior because the microphone is further away from the allocated participant and will also pick up more sounds from the other participants and other noises.

Furthermore, the sheer difficulty, complexity and length of the subsequent editing process is sufficient to deter people from adopting this idea unless it is a necessity. When more than one camera is used to record the same event, decisions are required on which of two or more simultaneously recorded camera image outputs (video streams) are selected at any time, in addition to a decision as to how to deal with the plural accompanying sound signals (audio streams). Nevertheless, it is known to edit multiple recordings, as in U.S. Pat. No. 5,206,929 (Langford), incorporated herein by reference, where although there is a degree of automation, the user does need to view all of the recordings fully to decide on the edited result.

International Patent Application No. WO 00/27125, incorporated herein by reference, (Telecordia) relates to a system in which video signals from different sources are automatically combined or selected to provide an edited result, and which is described in relation to recording an auditorium type of presentation for display to a remote audience. There is also an article "Videography for Telepresentations" by Yong Rui et al, Technical Report MSR-TR-2001-92, Feb. 10, 2001, Microsoft Research, Microsoft Corporation, incorporated herein by reference, which deals with the question of recording both a presenter and members of an audience at a presentation. International Patent Application No. 99/56214, incorporated herein by reference, (Sensormatic) discloses an apparatus in which audio and video streams are analysed for various purposes, including an application in which parts of a stored sequence are highlighted for selective playback.

By contrast, of course, professionally produced material commonly uses a plurality of cameras which are carefully placed, manoeuvred and operated by skilled operators, and the edited result consists of a number of clips from each camera interspersed with clips from the other cameras, to retain and stimulate the viewer's interest by showing what is regarded as the most interesting view all the time. In addition portable microphones can optionally be used for superior sound quality, and the sound can be mixed by conventional well known techniques. In many cases several takes of a scene are required to provide the requisite result, and the flow of conversation is necessarily repeated during each take. This is an expensive option, and one not altogether suited for more informal or domestic productions, where it is desired to record a spontaneous unscripted conversation for example.

SUMMARY

Various embodiments provide a system and method for producing an edited video signal from a plurality of cameras. Briefly described, one embodiment is a method that produces an edited video signal from a plurality of cameras wherein at least the imaging lens of each of the camera being held or worn by a respective one of a plurality of participants simultaneously present at a site, comprising receiving contemporaneous audio streams from at least two participants, selectively deriving from the audio streams a single audio output signal according to a predetermined first set of one or more criteria, receiving contemporaneous video streams from at least two of the cameras, and deriving from the video streams a single video output signal according to a predetermined second set of one or more criteria.

Another embodiment comprises an apparatus for use at a site where at least two participants are simultaneously present, the apparatus comprising: at least two cameras for carrying or wearing by the respective participants for providing respective video streams, at least two microphones associated with respective ones of the cameras, each of the microphones adapted to provide a respective audio stream; an audio signal mixer for receiving contemporaneously the audio streams and adapted to derive selectively therefrom a single audio output signal according to a predetermined first set of one or more criteria; and a video signal selector circuit for receiving contemporaneously the video streams and adapted to derive therefrom a single video output signal according to a predetermined second set of one or more criteria

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
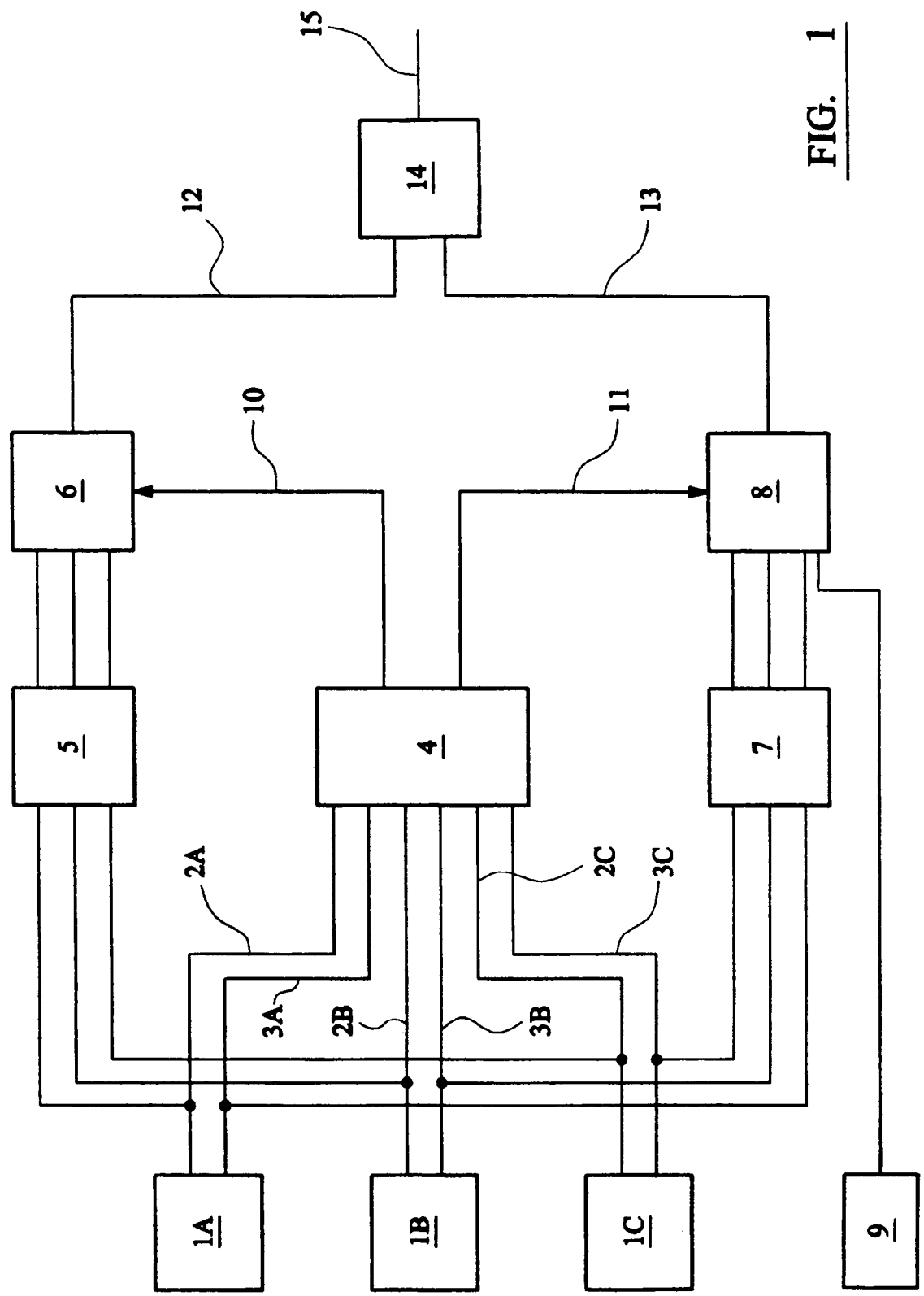
FIG. 1 is a schematic block circuit diagram showing the general arrangement of apparatus according to a first embodiment.

An exemplary embodiment provides a camera apparatus for use at a site where at least two participants are simultaneously present, the apparatus comprising: at least two personal cameras for carrying or wearing by respective participants for providing respective image video streams; microphones associated with respective ones at least two of said cameras, each said microphone adapted to provide a respective audio stream; audio signal mixing means for receiving contemporaneous audio streams and adapted to derive selectively therefrom a single audio output signal according to a predetermined first set of one or more criteria; and video signal mixing means for receiving contemporaneous image video streams and adapted to derive therefrom a single video output signal according to a predetermined second set of one or more criteria.

The provision of a personal camera for carrying or wearing by a participant, particularly if it is wearable, and even more particularly if the camera, or at least the imaging optics thereof, is adapted to be worn on the head, does much to solve the problem of camera pointing since it is to be expected that in most circumstances the view will follow the flow of conversation, i.e. be directed to the present speaker. Nevertheless, embodiments may also encompasses the use of cameras or imaging optics worn elsewhere on the person (for example as part of a badge) and also the use of hand held cameras, where a participant might be expected to point the camera, e.g. a video camera left running continuously, in generally the right direction but without continuous monitoring of the viewfinder or camera controls. It is to be noted that in much of the prior art the camera is commonly located at a fixed position, and/or is operated by a non-participant.

In addition if the microphone is closely associated with a user (participant), for example a microphone adapted to be worn separately by the participant, or one forming part of the camera itself, then the sound quality from that participant is improved.

As will be recognised by practitioners, the term "mixing means" may be used to denote a means for selectively passing one of a plurality of signals at any time. In the described embodiments, this type of operation applies to the video signals.

However, particularly for audio signals, it may alternatively denote a means for combining simultaneous signals from more than one source to obtain a desired result. Either or both types of operation, i.e. including cutting, fading and cross-fading, may be used in various embodiments.

In the later described embodiments, the audio mixing means receives and assesses the audio streams from the microphones to identify a stream which is adjudged to have the highest relevance using a first set of one or more predetermined criteria. The participant (speaker) associated with the microphone providing this stream is then identified, following which video streams which contain an image of that participant are identified. Using the second set of one or more criteria, an attempt is made to identify a most useful video stream for use as the video signal to be selected at that time.

An exemplary video signal includes an image of the speaker, and so will not be the video stream from the speaker's camera. However, in certain instances, another video stream may be employed. For example, as described herein, an embodiment may be able to detect interactions between pairs of participants from a particular stream (such as a swift glance from image or optical flow analysis of a video stream), and a stream providing an image of one or other of the pair may be adopted as the most significant stream for the time being. Alternatively, or additionally, various embodiments may be adapted to detect when two or more participants (a lower threshold could be set on a predetermined number of participants) are viewing the same region, such as a scene or object, and a stream providing view of that scene or object may then be adopted as the most significant stream for a period of time. In the absence of any most useful stream a different signal may be substituted, for example a key frame of the speaker, or a signal from a fixed camera viewing the entire scene.

It may happen that a single video stream is adjudged the most useful for an excessive length of time, which could lead to visual boredom in the edited result. Accordingly, an embodiment may be arranged so that such streams are broken up, with parts replaced by other useful video streams (or the different signal mentioned at the end of the preceding paragraph). In this context, a useful video stream does not necessarily need to fulfil any criterion (b) regarding an image of a participant—a stable video stream from a participant who is looking elsewhere and not at any other participant, equivalent to a cut-away shot, could be just as suitable and may well increase overall visual interest in the edited result.

Periods may exist where no audio stream is adjudged relevant according to the first set of criteria, for example "quiet periods" where no participant is talking. These periods may be omitted from the edited signal, with a consequential omission of any video image signal at these times. In some embodiments, such "quiet periods" are only reduced to a threshold length when they are above that threshold length, and are otherwise retained, and to occupy these periods the selected video streams are prolonged at either end if possible, or different video streams are employed.

Alternatively, during such "quiet periods" a substitute audio signal may be employed. For example, a blend of all the audio signals, and there will be rules for selecting accompanying video image. Also, the existing video image may continue until it becomes unacceptable, at which time it may be replaced by another acceptable image, if available; or an image from a camera viewing the overall scene may be employed; or switching between acceptable video images may be employed if two or more such images are simultaneously available. The latter technique may also be employed whenever the view from one camera has been selected for at least a threshold period of time.

Where two or more audio streams are adjudged to have equal relevance, for example where two or more participants are talking at the same time, the audio mixer may be employed to mix the streams, and rules will be in place for selecting which video stream to select if two or more acceptable streams are available, one for each speaker.

Thus the audio signal processing means may include an audio judging means for judging each of said audio streams to identify at any time according to the first set of criteria which if any of said contemporaneous audio streams is most relevant. This first set may, for example, include one or more conditions such as (a) a relevant stream including speech from the associated participant; (b) a relevant stream having an above—threshold loudness and/or clarity; and (c) where there is more than one audio stream at the same time which could be the most relevant (for example as determined by one or both of conditions (a) and (b)), the loudest signal is chosen as the most relevant.

Condition (c) above allows changes in the flow of the conversation to be more easily followed. An alternative to condition (c) is the condition that where there is more than one audio stream at the same time which could be the most relevant, an existing most relevant speech signal is maintained the most relevant until its loudness and/or clarity falls below a predetermined threshold level. This enables the existing speech to be followed in its entirety more easily in the edited version. In practice techniques known to the skilled technician may be adopted to blend and/or fade together sounds from two or more participants so that all significant contributions can be followed. For instance weightings may be given to each audio stream according to their adjudged relevance.

With respect to the references to loudness in conditions (b) and (c), it is possible to make the audio judging means adaptive, in order that participants with naturally loud voices, or who are placed nearer to their microphones, do not dominate the edited stream in preference to participants with quieter voices, or who are relatively remote from their microphones.

In later described embodiments, the audio signal mixing means is arranged to selectively transmit as the audio signal output audio stream adjudged to be the most relevant, or to provide a mixture of at least two audio streams in which the most relevant audio stream is most weighted. Where necessary (i.e. when "quiet periods" are included in the edited signal), the audio mixing means may be arranged so that when no signal is judged to be most relevant it provides one signal from the following group: (i) zero signal; (ii) a composite of said audio streams; (iii) another audio stream, e.g. from a microphone receiving sound from the entire scene, such as a microphone associated with or forming part of a camera viewing the entire scene; or (iv) the stream existing before the commencement of the "quiet period".

The second criterion or set of criteria may be used to assess which video streams are useful, and if there is more than one such stream to judge which is the most useful. For any video stream, these may be broken down into criteria representative of (a) picture quality as adjudged from the individual video stream itself; (b) picture interest as adjudged from the individual video stream itself; and (c) criteria based upon other streams.

An exemplary non-exhaustive list of possible criteria (a) is:
 a1. Does it arise from a camera with movement below a threshold level?
 a2. Does the image it represents lie within a threshold of focus?
 a3. Has it a desired degree of composition?
 a4. Does it comply with whatever one or set of conditions a1 to a3 has been selected for at least a threshold period of time?

With respect to criteria a3 and a4, preferred compositions would include the presence of a participant's face or participant, more preferably looking at the camera. Account could also be taken of other details, such as location of the participant image to the frame edges, for example to avoid cutting the participant's image in undesirable locations such as at ankles knees or elbows. The use of head mounted tags mentioned below, whether on the person or a head mounted camera, has a further advantage in that if a tag is detected in the field of view of a camera, it is known that the camera is pointing at the head.

An exemplary non-exhaustive list of possible criteria (b) is:
 b1. Is the image it represents that of a participant?
 b2. Has an unusual expression on a participant's face been detected?
 b3. Does it represent a participant who is gesturing significantly?
 b4. Does it comply with whatever one or set of conditions b1 to b3 has been selected for at least a threshold period of time?

Various embodiments of the video signal mixing means may include video assessing means arranged to accept a video stream as being useful if it complies with at least one or a specified combination of the criteria (a) and/or (b) listed above. In the embodiments described herein, criteria a1, a3, a4 and b1 are adopted, and for criterion a2 it is assumed that autofocus mechanisms on the cameras provide a sufficient degree of focus all of the time.

Examples of criteria (c) are:
 c1. Does it contain an image of the participant providing the most relevant audio signal?
 c2. Is more than a predetermined number (including one) of participants looking at the same general field (object or view) albeit from different perspectives?

In connection with criterion c1 the apparatus may include participant identification means.

In one embodiment, the participant identification means is for identifying which video streams contain images of which participants, and in such a case it may form part of the video signal mixing means. For example:
 (i) the participant identification means may include means for storing information on the appearance of each participant and matching means for matching the information against the image information in said video streams. This information may be stored prior to use of the apparatus, or obtained during use by analysis and correlation of the different audio and video streams; or
 (ii) optical tags may be associated with each participant or camera, for example being part of the camera or being worn e.g. on a participant's head or body. The tag provides information (for example a passive pattern, or a coding of an emitted optical signal) which can be retrieved from the video stream for identifying the participant, either directly, or (if the tag identifies itself) by way of a known and stored association between the tag and the participant.

It then remains for the outputs of the participant identification means to be correlated against the participant providing the most relevant audio stream. This type of arrangement is employed in the embodiments described herein.

Alternatively, or additionally, the participant identification means may be for analysing the video streams to identify lip movements corresponding to the most relevant audio stream mentioned above. In that it is possible in this manner to derive from the audio and video streams a correlation between a speaker and characteristics of the speaker's appearance, this type of arrangement could also be used to derive information regarding participant appearance during use of the apparatus.

Where tags are provided, the use of optical tags with detection from the video stream is possible, since the detection of a tag then provides confirmation that a participant is being viewed. Nevertheless, it is also possible to employ non-optical tags, for example acoustic or radio tags, where the emitted signal contains coded information for use in identifying the participant, or to use optical tags with detection other than from the video stream. In either case, it will be necessary to provide some other form of tag detection means, preferably located on the camera or located adjacent thereto in use, so that its detection field is at least approximately in the same direction as that of the camera, so that the identified participant may be associated With the video stream with greater certainty. The output of the tag detection means would be coupled to a tag reading means for identifying the tag or the tag wearer, this information being coupled for use by the video signal mixing means. The tag reading means may be physically associated with the tag detection means, e.g. at the camera, or with the video signal mixing means. Thus, in this type of arrangement, the participant identification means may be wholly or partially separate from the video signal mixing means.

In connection with criterion c2, thus far it has been assumed that it would be desirable to view a speaker, if possible, for most of the time (an exception being that of breaking up an excessively long view of one speaker). However, there are also situations where more than one, and possibly all, or the participants are looking towards a common point, for example an exhibit, object or scene of interest, possibly one about which one participant is talking. This may be strongly indicative of a shared interest and therefore of a highly salient view which should be shown in the edited video.

Automatic detection of such situations is possible by wide baseline stereo matching techniques as described in "Multi-view Matching for Unordered Image Sets", F Schaffalitzky et al, European Conference on Computer Vision 2002, pp 414-431, incorporated herein by reference. An alternative embodiment which is faster but less robust, compares and correlates the location and/or directions of the different cameras using motion sensors such as electronic compasses or gyros on the cameras themselves. Fulfilment of criterion c2 therefore means that any of the related video streams could be selected as the most useful, and a judgement therebetween for the final video stream selection can then be made on some other basis, for example a random basis or on the basis of other criteria (a) and/or (b).

Indeed, how a group of participants look towards a common object or area is a new measure of saliency which can be associated with that object or area. For example, such a saliency measure could be derived (a) according to the number of participants instantaneously looking, or (b) according to the sum (for every participant) of the periods over which the object or area is observed by each participant (for example in a moving time window), or (c) the period over which at least a minimum number (greater than one) of participants observes the object or view. Measure (b) could be modified for example by dividing by the total number of participants, or by including only the longest continuous observation by any participant during the time window (so that if the participant looks twice in the same window only the longest look is taken into account). Likewise measure (c) could be modified for example by fixedly or variably weighting parts of the period where more than the minimum number of participants is looking.

Accordingly, embodiments extend to measuring the saliency of an object or area in the vicinity of a group of people as a function of how the object or area is observed by individual members of the group.

It should be understood that for a video stream to be assessed as useful, any of the criteria (a) to (c) could be adopted per se or in any suitable algebraic and/or logical combination. In addition the different criteria could be differently weighted so as to contribute differently to the final result. For example, the different weightings according to which criteria are met could be added to judge whether the sum reaches a threshold level indicative of overall usefulness. It should also be understood that the preceding criteria are not the only possible criteria, and other criteria could be used alone or in logical combination.

Indeed, because each criterion is indicative of the saliency of the video stream, some form of marking scheme could be adopted based upon a plurality of criteria, with the highest marked stream being taken as the most salient or most useful stream.

However, in the embodiments described herein, criteria a and b are employed to judge which video streams are useful. If there is more than one useful stream, a further judgement is made therebetween to identify a most useful stream for incorporation into the edited video stream, and this may employ one or both of the criteria c1 and c2 set out above (c1 as described). If both criteria are adopted, usually one, e.g. c1, would be given precedence over the other to avoid any clash in the deciding which is the most useful video stream. Criterion c2 might be given the precedence is situations such as when attending an exhibition, e.g. an art gallery or museum, or a demonstration, where more importance may be attached to what is being looked at rather than the speaker.

Thus the video signal mixing means may additionally include a video judging means for judging the useful video streams (if any) to identify according to said second set of criteria which video stream if any is the most useful. In particular, the video judging means may be arranged to accept the video stream from the participant associated with the most relevant audio signal from being judged the most useful only if it is the only stream judged to be useful.

The video signal processing means may include video selector means for selectively passing the most useful video stream as said single video output signal.

Furthermore, an apparatus embodiment also includes substitute means for providing a substitute video signal, the video selector being arranged to pass a substitute video signal in the absence of any said most useful video signal.

Exemplary forms of substitute means include one or more of (a) a memory; (b) an additional camera for viewing all of the participants; and (c) key frame means for deriving key frames including images of said participants for the said video streams. The substitute video signal e.g. in the memory (a), may include an image of the participant corresponding to said most relevant audio stream.

A continuous single view of a speaker who is speaking at length may be monotonous. Therefore in a refinement, the video signal processing means can be arranged to break up continuous video clips from a single most useful video stream having an above threshold length by insertion of clips (parts of the whole of useful video streams) from other ones of said cameras, or key frames derived therefrom, or from a camera viewing the whole scene. These clips may or may not be of the speaker, and they could, for example, include images of the person addressed. They might alternatively comprise any common view of a non-participant scene according to criterion c2 above, or a view of a non-participant scene identified according to one or more of criteria (a) above as being acceptable. Thus, when at an exhibition, one participant may be speaking at length about a particular exhibit, and some participants may be looking at the exhibit and others at the speaker, so that an alternation of views of the exhibit and the speaker may appear in the edited programme.

A further advantage of being able to identify which camera is looking at which person, by any of the means discussed above, is that it is possible to derive a corresponding map for determining whether or not a video stream is useful. For example, in an assembly of four or more participants, while a first participant is speaking to a second participant, the third participant may glance at the fourth. This action could be detected, and a corresponding saliency attached to that video stream for potential use, for example either as an inserted clip within a most useful stream showing the second participant, or as the most useful stream in its own right.

At least one of the cameras may be provided with means for controlling at least one of pan, tilt and zoom, particularly (but not exclusively) for cameras or imaging optics not worn on the head. This may be responsive to the audio streams, for example, by being directed towards the participant providing a most relevant audio stream of the type discussed below. It may be responsive additionally or alternatively to the composition of the image, e.g. as provided by analysis of the video stream from that camera, and in particular the location in the frame of the presently viewed participant as provided by the video stream from that camera.

Various embodiments extend to a method of producing an edited video signal from a plurality of cameras, at least the imaging lens of each said camera being worn or carried by a respective participant simultaneously present at a site, the method comprising receiving contemporaneous audio streams from at least two participants and selectively deriving therefrom a single audio output signal according to a predetermined first set of one or more criteria; receiving contemporaneous image video streams from at least two of the cameras and deriving therefrom a single video output signal according to a predetermined second set of one or more criteria.

Embodiments may include identifying a most relevant audio stream according to said first set of criteria, and the latter may include at least one of clarity, loudness and presence of speech content. The most relevant audio stream may be selected as said single output signal either by itself or admixed with other said audio streams.

In an embodiment, one of the video streams is selected as the single video output signal. To this end, the video streams are judged according to the second criteria, which include at least one of: degree of focus; camera motion; presence of a participant in the image; whether it contains an image of the participant providing the aforesaid most relevant audio stream.

The periods for which the video streams are selected need not match the periods for which the different audio streams are initially selected. In particular, there are recognised rules for determining when best to cut a video stream, so that the times for commencing a video stream, for example when there is a change of speaker, may be adjusted away from the time at which the change of speaker occurs, as reflected in the change in audio stream. This may also apply when "quiet periods" are retained at least in part in the edited audio stream, when for example the existing video stream may be allowed to continue to the appropriate video cutting point or until it becomes unacceptable. In such a case, if the quiet periods are actually excised from the edited result, an adjustment to expand the selected audio streams to include starts and ends of some quiet periods may be necessary to accommodate the adjusted video cutting times.

For the purpose of describing various embodiments, the following list is a sequence of events E0 to E19 which could occur and from which an edited video is required. The events En are shown equally spaced, but this is for convenience of illustration only, and it should be understood that their times of occurrence might in fact be far from equally spaced.

E0 Three participants A-C have gathered. Each is fitted with a head worn camera which includes a microphone. No-one is speaking, A and B are looking down, and C is looking away from the other two.
E1 A looks at B
E2 A speaks
E3 B looks up at A
E4 A nods head
E5 C turns round to look at A
E6 A stops nodding
E7 B looks down again
E8 A stops speaking, still looking at B
E9 B looks up at C
E10 B turns to look at A
E11 B speaks
E12 C turns to look at B
E13 C speaks while B is still speaking
E14 B turns to look at C
E15 B stops speaking
E16 A turns to look at C
E17 C stops speaking and looks away again
E18 A speaks
E19 B turns to look at A FIG. 1 is a schematic block circuit diagram showing the general arrangement of apparatus according to a first embodiment.

The embodiment shown in FIG. 1 is arranged to perform the following functions:

1. To identify periods when at least one of the participants A to C is speaking, and to assemble an audio script therefrom.
2. To ascertain whether any of the cameras is producing an image signal providing an acceptable image.
3. In dependence upon the audio script, producing a video script for selecting the image signal from one of the cameras, or an image signal from memory.
4. Using the audio and video scripts for selectively combining the video streams and the audio streams from the three cameras for producing a single edited audio/video stream.

In FIG. 1, the three cameras 1A to 1C (where the letter indicates the participant) provide separate audio streams 2 (2A to 2C) and video (image signal) streams 3 (3A to 3C) which are fed to an editor 4. Depending upon the embodiment, the camera outputs could be a composite audio/visual signal, which is subsequently separated into audio and video components. The editor 4 acts to perform the tasks (1 to 4) set out above.

Signals 2A to 2C are also fed by a buffer or delay 5 to an audio mixer 6 (audio mixing means) controlled by the editor 4. Signals 3A to 3C are also fed by a buffer or delay 7 to a video selector circuit 8, which is also coupled to a memory 9 containing pre-recorded video signals representative of still images of each of the participants A to C. Mixer 6 is controlled by an audio script signal 10 from editor 4 to provide an edited audio stream 12, and selector circuit 8 is controlled by a video script signal 11 from editor 4 to select one of the buffered signals 3A to 3C or a signal for one of the participants from the memory 9, to provide an edited video stream 13, the latter being combined with the edited audio stream 12 at a combiner 14 to produce a composite edited audio/visual output signal 15.

The buffers 5 and 7 (effectively one buffer for each individual stream) act to allow time for the editor 4 and the associated mixer 6 and selector circuit 8 to act and to maintain synchronism with the video and audio streams in what is essentially a real time process. However, by slightly reconfiguring the arrangement they may be replaced by recorders/memories, as in the second embodiment shown in FIG. 3.

While the editor 4 could be composed of individual dedicated block circuits for effecting its necessary functions, preferably it is a circuit arrangement driven by software.

Figure 2:
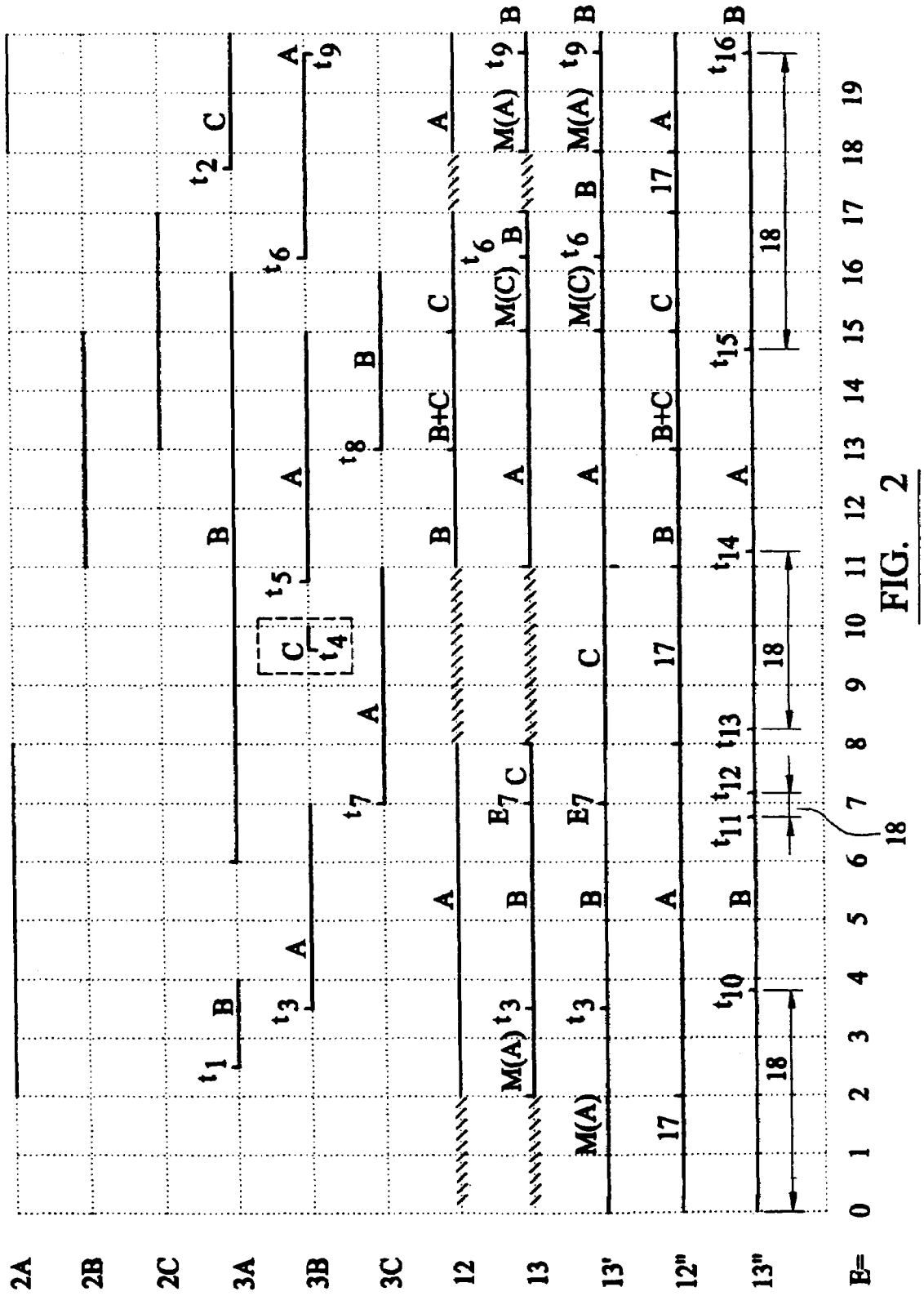
FIG. 2 is a chart illustrating various events associated with three participants involved in a common activity.

FIG. 2 is a chart illustrating various events associated with three participants involved in a common activity, for example children and/or adults at a picnic or on the beach, perhaps doing something like building a sandcastle or playing a game; people visiting a site of interest, or watching an event such as athletics or horse-racing; a birthday party or other social gathering; or even just seated around a table or at a bar. It is to be noted that while much of the prior art can be used only in situations where people are relatively stationary, embodiments are useful both in such contexts and also where people are free to move around and freely interact with each other. The editor 4 (FIG. 1) receives the audio streams 2A to 2C and judges when the signal level is above a threshold level and is a speech signal (e.g. as opposed to laughter or some other non-speech signal), as indicated in the plots 2A to 2C of FIG. 2. It will also identify the associated speaking participant(s) because of the connections with (or coupling to) the camera microphones.

The editor 4 also receives the video streams 3A to 3C and judges when the picture quality is acceptable. In this embodiment the editor 4 is arranged to reject signals indicative of excessive camera movement, signals which do not represent another participant, and signals which are acceptable except that they have a duration below a threshold level (this avoids unacceptably rapid switching between different camera outputs).

Excessive camera motion may be detected for example, by optic flow analysis. Alternatively, the individual cameras (or the participants' heads) could be provided with motion detectors, such as accelerometers or gyros for the same purpose, the resulting signal being sent to the editor 4.

While there are other ways of detecting whether or not the image being received by a camera is representative of another participant, for example by image analysis with reference to pre-stored image details or the stored images in the memory 9 (FIG. 1), in this particular embodiment a tag is associated with each camera (located thereon, or on the head or upper part of the body of a participant wearing or carrying the camera). Depending upon the type of tag, a dedicated detector (e.g. infra-red, radio or acoustic) may be necessary. In some embodiments, tags are mounted on or directly adjacent to the camera so that when such a tag is detected from another camera, its presence is indicative of the fact that a participant is being viewed by the other camera. In one embodiment, the tag provides information (e.g. coding of an emitted acoustic, infra-red or radio signal, or an infra-red pattern) serving to identify the viewed participant.

In one embodiment, the tag is an optical one, such as a visible or infra-red bar code (a passive tag), or an active light emitting tag such as a modulated infra-red LED, which can be recognised from an analysis of an image signal. However, as noted above, it could be a different type of tag, for instance an acoustic, optical or radio emitter, for detection by a suitable receiver at the camera/participant, with the resulting signal being coupled to the editor 4. Passive and (to a slightly lower extent) active optical tags have the advantage that detection thereof requires a well directed detector (e.g. the camera itself) and so is strongly indicative that the participant is in the camera field of view, whereas the less strongly directional properties of other types of radiation make this less certain.

The resulting acceptable signals are shown in plots 3A to 3C of FIG. 2. It will be observed that the commencement of acceptability does not necessarily coincide with the events En. Where En happens, the commencement is shown as a time tn. The ending of acceptability may also not coincide therewith, although as shown for simplicity it does in each instance. Although the second line of plot 3B is shown (t4 to E10), it is placed in a dashed box to indicate that it is too short to be acceptable.

In one form of operation, the editor 4 is arranged to produce an edited audio script in which intervening quiet periods are omitted. When a single participant is speaking, that audio stream is selected as the most relevant, and the editor 4 instructs the mixer 6 (FIG. 1) to select only that audio stream. The contemporaneous video streams are then examined to ascertain whether at least one contains an image of the speaker. Thus, for example, B speaks between events E11 and E15 and stream 3A shows participant B for all of this period, while stream 3C covers only a period from time t8 to E15 of this period. However, when A speaks between E2 and E8 stream 3B provides an image of A only between t3 and E7, and similarly C is only imaged during the period t6 to E17 of the period E13 to E17.

Where a single speaker is imaged by a single video stream, that stream is selected as the most relevant. Where the speaker is imaged by more than one stream, the stream which provides the most complete coverage is selected as the most relevant. Where more than one stream provides complete coverage while the speaker is speaking, a choice is made between them on some predetermined basis, e.g. random, the longest acceptable stream, the stream coming from the participant being addressed if that can be detected, etc. Where the speaker is not imaged by any video stream, a still image of the speaker is selected from the memory 9 by some embodiments.

To effect this type of operation, it is necessary to determine which participant is imaged by each of the video streams, and it will be noted that each of plots 3A to 3C indicates which participant is being viewed. This is most easily accomplished by the use of tags providing information identifying the wearers, although again, other techniques such as image analysis may be used.

Where more than one speaker is speaking at the same time, as between E13 and E15, editor 4 instructs mixer 6 to mix the relevant streams. The video streams are examined to judge whether there is a suitable stream for at least one speaker. If only one speaker is so covered, the editor 4 instructs selector circuit 8 to select that stream. If no speaker is covered, the circuit 8 is controlled to select a still image of one of the speakers, e.g. the loudest, from the memory 9 (FIG. 1). If more than speaker is covered, the selector circuit 8 is controlled to select a single video stream, for example that of the loudest speaker.

The resulting audio and video streams are shown on lines 12 and 13 of FIG. 2, where the hatched lines E0 to E2, E8 to E11, and E17 to E18 represent portions excised from the edited version (thus E8 and E11 for example are coincident). The letter(s) above plot 12 indicates the speaker(s), and the letter above plot 13 indicates the participant camera providing selected video stream or the memory (thus M(A) is the image of participant A in memory 9). Lines 12 and 13 may be regarded as counterparts to the script signals 10 and 11 (FIG. 1) controlling operation of mixer 6 and selector circuit 8 respectively.

In a variation of the above operation, the intervening hashed "quiet" periods are retained. During those periods, the audio streams may be suitably blended together at mixer 6. Indeed, during the above operation and this variation, it is possible to control the mixer 6 to add in minor amounts of sound from the non-speaker streams to provide an ambience. During the "quiet" periods, the selector circuit 8 is controlled to continue to pass the existing selected video stream so long as it remains acceptable; to pass any other acceptable stream if one for the last speaker does not exist; or to pass an image, or a sequence of images, from the memory 9 if no acceptable video stream is available. The resulting edited video stream is shown in line 13' of FIG. 2, and it is possible to assign the initial period E0 to E2 provided the length of buffers 5 and 7 (FIG. 1) is sufficient.

In either form of operation, the editor 4 may be arranged to control selection circuit 7 (FIG. 1) to switch from the existing selected video stream after a predetermined threshold duration thereof has been reached, for example to another acceptable video stream if such is available.

Figure 3:
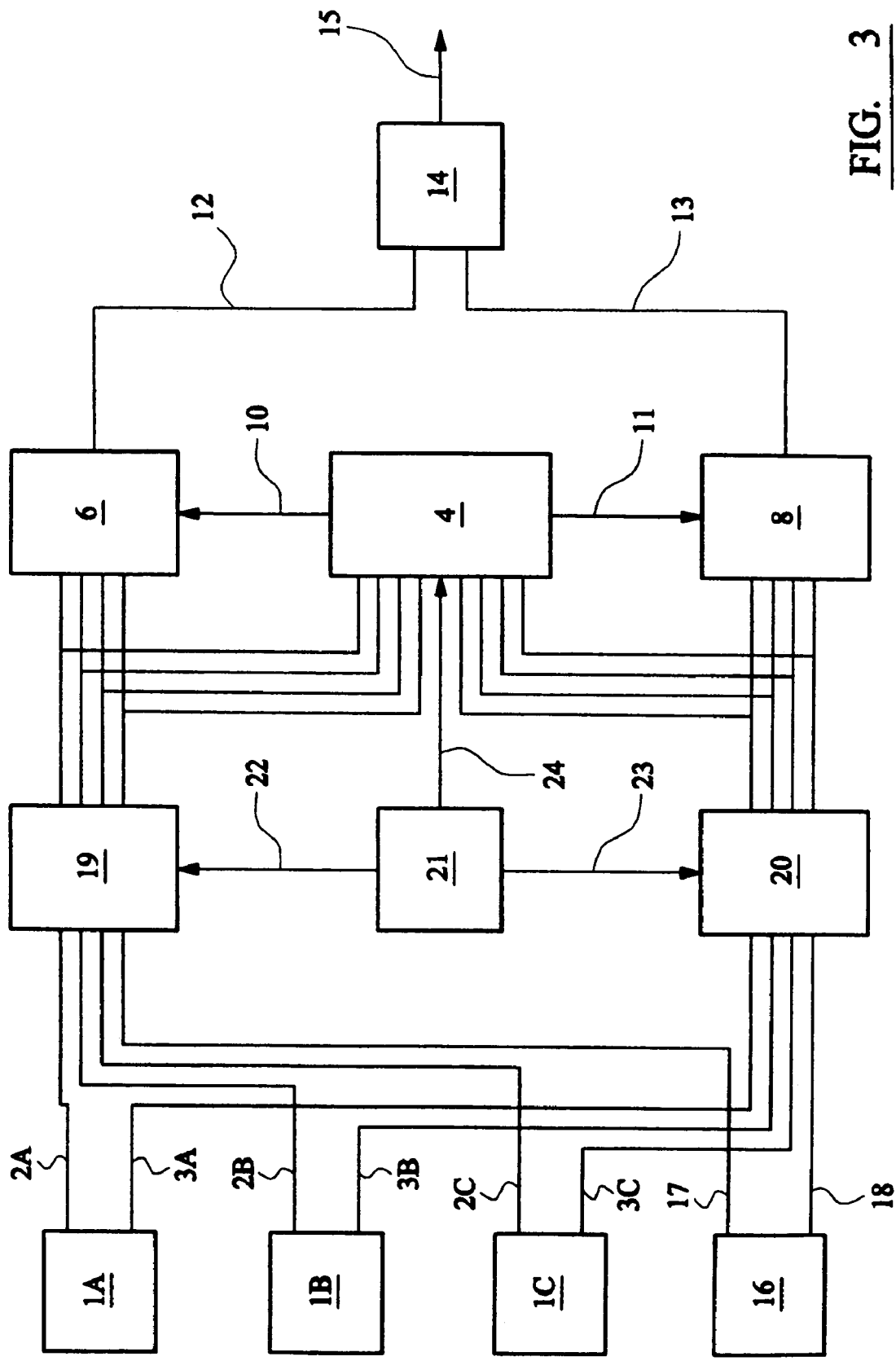
FIG. 3 is a schematic block circuit diagram of a second embodiment.

FIG. 3 shows a second embodiment of apparatus in which the memory 9 (FIG. 1) is omitted, and an additional camera 16 is provided for viewing the whole of the area where the participants are located. In this embodiment, the editing is performed after the video streams and audio streams have been recorded.

The set of four audio streams 2A, 2B, 2C and 17 and the set of four video streams 3A, 3B, 3C and 18 from the cameras 1A, 1B, 1C and 16, respectively, are recorded separately in respective recorders or memories 19, 20 under the control of signals 22, 23 from a central control unit 21. At a later time, the processor 21 is activated to produce control signals 22, 23 for retrieving the recorded audio and video streams for analysis and the production of audio and video scripts. It would equally be possible to use the memories of the cameras themselves, all that is necessary being the facility to repeatedly recall the original signals. Again, the signals from the cameras 1A, 1B, 1C and 16 may be composite audio/visual signals, which are split into the audio and video streams either before or after the recorders 19, 20.

When the audio and video streams are retrieved, the control unit also activates the editor with a control signal 24 to judge them as in the first embodiment, and to provide audio and video script signals, which are initially stored in the editor. Once the whole of the streams have been judged, the control unit activates the memories 19, 20 to reproduce the two streams once more, and also supplies the script signals 10, 11 to mixer 6 and selection circuit 8 for eventual production of a composite edited audio/visual signal 15 from combiner 14, as before. The double readout of the two streams from the memories 19, 20 avoids the use of large buffers; nevertheless, buffers may be provided if necessary to enable adjustment for synchronisation of the two streams and the control signals 10, 11.

In this embodiment, the video stream 18 from the additional camera is used as the edited stream in lieu of the output of memory 9 of the first embodiment when no acceptable video stream is available, i.e. replace references to M in line 13 or 13' of FIG. 2 with references to signal 18. The audio stream 17 is employed as the edited audio stream when no participant is speaking (i.e. in the hashed region of line 12 of FIG. 2), optionally admixed with the audio streams 2A to 2C.

In a more advanced and complex embodiment, account is taken of the desirability of cutting the video streams at particular times, for example, when little movement is occurring in the viewed field. Determination of such times can be effected by known techniques, and has the effect of altering the available length of the acceptable video streams, in general tending to shorten them.

This is illustrated in the bottom line 13" of FIG. 2, for the embodiment of FIG. 3, the preceding line showing the audio stream for this embodiment. It will be seen that in most cases the audio streams will be selected a little later (t10, t12, t14, t16) and will cease a little earlier (t11, t15). However, in the case of t13, this occurs a little later, because the available video stream continues into the quiet period E8 to E11, so that a cutting point after the commencement of the quiet period may be chosen.

In a post-recording editing process, such as is described with respect to FIG. 3, but also probably when processing in real time, it is necessary to ensure synchronism between all of the recorded and replayed streams. This may be effected by using a camera timestamp; by ensuring correlation between the audio streams; or by referring each stream to a reference signal, for example an identifier signal periodically emitted by one camera which is received and recorded by each of the other cameras.

Although the apparatus of FIGS. 1 and 3 is shown as separate from all of the cameras, it could be incorporated into a master camera which is in communication with all the other cameras in an alternative embodiment.

Where the editor 4 is implemented using a circuit which is programmable by software, it is possible to arrange for it to be operated in a number of different modes, for example for switching between the operation illustrated with respect to FIG. 1 and that illustrated with respect to FIG. 3. Whether implemented in hard wired dedicated circuits or in software, user operable controls may be provided for selecting and altering parameters which dictate the editing process, for example for selecting which criteria (a) to (c) are to be used, and for setting the maximum length of any one video clip.

Figure 4:
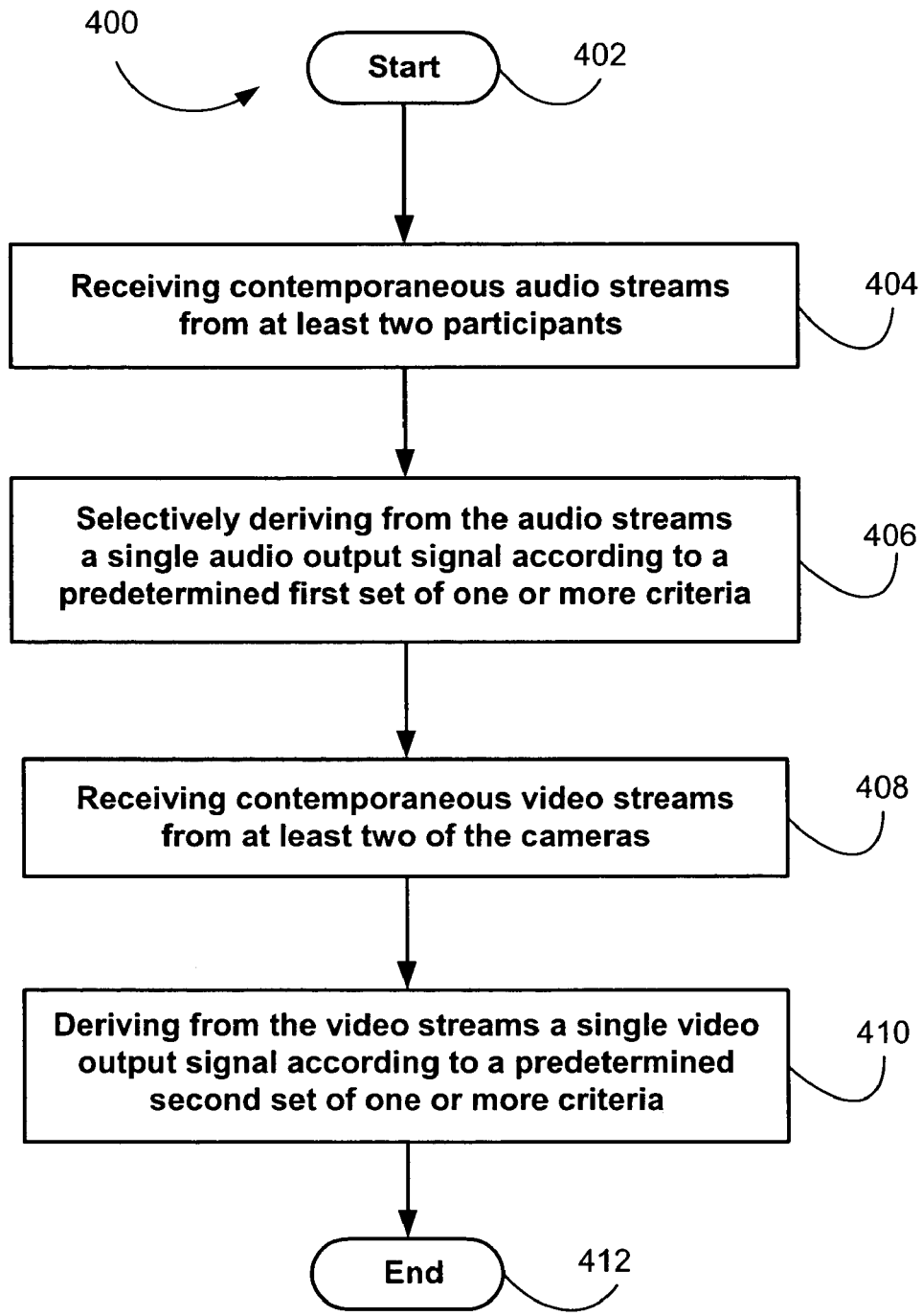
FIG. 4 is a flow chart of a process used by an exemplary embodiment.

FIG. 4 is a flow chart 400 illustrating a process used by various embodiments for producing an edited video signal from a plurality of cameras. The flow chart 400 shows the architecture, functionality, and operation of a possible implementation of the software used by the various embodiments. In this regard, each block may represent a module, segment, or portion of code, which comprises one or more executable instructions for implementing the specified logical function (s). It should also be noted that in some alternative implementations, the functions noted in the blocks may occur out of the order noted in FIG. 4 or may include additional functions. For example, two blocks shown in succession in FIG. 4 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

As noted above, FIG. 4 is a flow chart 400 illustrating a process used by various embodiments for producing an edited video signal from a plurality of cameras. In at least one embodiment, the process produces an edited video signal from a plurality of cameras using at least the imaging lens of each of the camera being held or worn by a respective one of a plurality of participants simultaneously present at a site. The process starts at block 404: At block 406, contemporaneous audio streams are received from at least two participants. At block 406, a single audio output signal is derived from the audio streams signal according to a predetermined first set of one or more criteria. At block 408, contemporaneous video streams are received from at least two the cameras. At block 410, a single video output signal are derived from the video streams according to a predetermined second set of one or more criteria. The process ends at block 412.

What is claimed is:

1. A camera apparatus, comprising:
   at least two cameras configured to by carried or worn by respective participants and operable to produce respective video streams;
   at least two microphones associated with respective ones of the cameras, each of the microphones being adapted to produce a respective audio stream;
   a data processor operable to perform operations comprising
      selecting at least one of the audio streams according to a predetermined first set of one or more criteria,
      choosing at least one of the video streams according to a predetermined second set of one or more criteria. wherein the choosing comprises determining at least one of the video streams that comprises an image of a source of audio content of the selected audio stream based on an image content based analysis of the video streams,
      outputting an audio mixing control signal and a video selecting control signal based on the at least one selected audio stream and the at least one chosen video stream;
   an audio signal mixer operable to receive contemporaneously the audio streams and adapted to perform operations comprising deriving a single audio output signal from at least one of the received audio streams according to the audio mixing control signal; and
   a video signal selector circuit for receiving contemporaneously the video streams and adapted to perform operations comprising deriving a single video output signal from at least one of the received video streams according to the video selecting control signal.

2. The apparatus of claim 1, wherein the derived single audio output signal is associated with the second set of criteria such that the single audio output signal and the single video output signal correspond with each other.

3. The apparatus of claim 1, further comprising a combiner wherein the single audio output signal and the single video output signal are combined to produce a composite audio/visual output signal.

4. The apparatus of claim 1, wherein a first one of the cameras is carried or worn by a first one of the participants and is capturing the respective video stream of the other participant.

5. The apparatus of claim 4, wherein the first camera is directed at the other participant by the first participant.

6. The apparatus of claim 4, wherein a second one of the cameras is carried or worn by the other participant and is capturing the respective video stream of the first participant.

7. The apparatus of claim 1 wherein in the selecting the data processor is operable to perform operations comprising judging each of the audio streams for relevance according to the first set of criteria selecting one or more relevant ones of the audio streams.

8. The apparatus of claim 7 wherein the first set of criteria further comprises the condition that all the audio streams selected as relevant audio streams comprise speech from the associated participant.

9. The apparatus of claim 7 wherein the first set of criteria further comprises the condition that all the audio streams selected as relevant audio streams exceed a threshold for loudness.

10. The apparatus of claim 7 wherein the first set of criteria further comprises the condition that the audio stream selected as a most relevant audio stream exceeds a threshold for clarity.

11. The apparatus of claim 7 wherein the first set of criteria further comprises the condition that where the data processor determines that there is more than one concurrent audio stream that is a relevant audio stream, the data processor selects a loudest one of the audio streams as the relevant audio stream.

12. The-apparatus of claim 7 wherein the first set of criteria further comprises the condition that where the data processor determines that there is more than one concurrent audio stream that is a relevant audio stream, that the data processor selects the audio stream with a greatest clarity is chosen as the relevant audio stream.

13. The apparatus of claim 7 wherein the first set of criteria further comprises the condition that where the data processor determines that there is more than one concurrent audio stream that is a relevant audio stream, the data processor sets the audio mixing control signal to control the audio signal mixer such that an existing relevant audio stream is maintained until its loudness falls below a predetermined threshold level.

14. The apparatus of claim 7 wherein the first set of criteria further comprises the condition that where the data processor determines that there is more than one concurrent audio stream that is a relevant audio stream, the data processor sets the audio mixing control signal to control the audio signal mixer such that an existing relevant audio stream is maintained until its clarity falls below a predetermined threshold level.

15. The apparatus of claim 7 wherein the audio signal mixer is arranged to selectively transmit as the single audio output signal the relevant audio stream.

16. The apparatus of claim 15 wherein the audio signal mixer is arranged to selectively transmit a mixture of at least two of the audio streams in which the relevant audio stream is most weighted.

17. The apparatus of claim 15 wherein , when no signal is judged to be the relevant audio stream, data processor is configured to set the audio mixing control signal to arrange the audio mixer to provide one signal comprised of at least one selected from a group consisting of a zero signal, a composite of the audio streams, and another audio stream.

18. The apparatus of claim 1 wherein in the choosing the data processor is operable to perform operations comprising identifying which video streams contain images of which participants.

19. The apparatus of claim 18 wherein in the choosing the data processor is operable to perform operations comprising
   retrieving stored information corresponding to an appearance of each participant; and
   matching the appearance information against image information in the video streams.

20. The apparatus of claim 18 further comprising a tag associated with each participant, wherein in the determining the data processor is operable to identify which video stream contains images of which participants based on the tag.

21. The apparatus of claim 18 further comprising a tag associated with each camera, wherein in the determining the data processor is operable to identify which video stream contains images of which participants based on the tag.

22. The apparatus of claim 20 wherein the tag is an optical tag.

23. The apparatus of claim 20 wherein the tag is a radio tag.

24. The apparatus of claim 20 wherein the tag is an infrared tag.

25. The apparatus of claim 20 wherein the tag is an acoustic tag.

26. The apparatus of claim 18 further comprising means arranged according to a second criterion to identify at least one video stream which contains an image of the participant associated with a useful video stream.

27. The apparatus of claim 1 wherein in the choosing the data processor is operable to perform operations comprising analyzing the video streams to identify lip movements corresponding to the selected audio stream.

28. The apparatus of claim 1 wherein in the choosing the data processor is operable to perform operations comprising choosing one of the video streams as the chosen stream if the video stream complies with at least one criteria selected from a group consisting of the following criteria:
 (a) it arises from a camera with movement below a threshold level;
 (b) an image it represents is within a threshold of focus; and
 (c) the image it represents is that of a participant's image.

29. The apparatus of claim 28 wherein the criteria complies with at least one of conditions (a) to (c) for at least a threshold period of time.

30. The apparatus of claim 1 wherein in the choosing the data processor is operable to perform operations comprising judging from the video streams to identify according to the second set of criteria which of the video streams is the most useful.

31. The apparatus of claim 30 wherein in the choosing the data processor is operable to perform operations comprising selecting the video stream from the participant associated with a most relevant audio signal as the most useful only if it is the only stream judged to be useful.

32. The apparatus of claim 31 wherein in the outputting the data processor is operable to perform operations comprising setting the video selecting control signal to configure the video signal selector circuit to selectively pass the most useful video stream as the single video output signal.

33. The apparatus of claim 32 further comprising substitute means for providing a substitute video signal and wherein in the outputting the data processor is operable to perform operations comprising setting the video selecting control signal to configure the video signal selector circuit to pass the substitute video signal in the absence of a most useful video signal.

34. The apparatus of claim 32 further comprising substitute means for providing a substitute video signal and wherein in the outputting the data processor is operable to perform operations comprising setting the video selecting control signal to configure the video signal selector circuit to pass a substitute image in the absence of a most useful video signal.

35. The apparatus of claim 33 wherein the substitute means comprises at least one selected from a group consisting of:
 (a) a memory;
 (b) an additional camera for viewing all of the participants; and
 (c) key frame means for deriving key frames comprising images of the participants for the video streams.

36. The apparatus of claim 33 wherein the substitute video signal further comprises an image of the participant corresponding to a relevant audio stream.

37. The apparatus of claim 1 wherein in the outputting the data processor is operable to perform operations comprising setting the video selecting control signal to configure the video signal selector circuit to break up continuous video clips from a single video stream when portions of the single video stream are above threshold length by insertion of clips from other ones of the cameras.

38. The apparatus of claim 1 wherein in the outputting the data processor is operable to perform operations comprising setting the video selecting control signal to configure the video signal selector circuit to break up continuous video clips from a single video stream when portions of the single video stream are above threshold length by insertion of clips from key frames derived therefrom.

39. The apparatus of claim 1 wherein in the outputting the data processor is operable to perform operations comprising setting the video selecting control signal to configure the video signal selector circuit to break up continuous video clips from a single video stream when portions of the single video stream are above threshold length by insertion of another image.

40. The apparatus of claim 1 further comprising an imaging lens of at least one of the cameras, the imaging lens adapted to be worn on the head of the participant.

41. The apparatus of claim 1 wherein the microphone is adapted to be worn by the participant.

42. The apparatus of claim 1 wherein the microphone is part of the camera.

43. A computer-implemented method, comprising:
 receiving contemporaneous audio streams;
 receiving contemporaneous video streams;
 selecting at least one of the audio streams according to a predetermined first set of one or more criteria;
 choosing at least one of the video streams according to a predetermined second set of one or more criteria, wherein the choosing comprises determining at least one of the video streams that comprises an image of a source of audio content of the selected audio stream based on an image content based analysis of the video streams;
 producing a single audio output signal from the at least one selected audio stream; and
 generating a single video output signal from the at least one chosen video stream.

44. The method of claim 43, further comprising combining the single audio output signal and the single video output signal to produce a composite edited audio/visual output signal.

45. The method of claim 43, further comprising identifying a relevant audio stream according to the first set of criteria.

46. The method of claim 45 wherein the first set of criteria further comprises at least one of clarity, loudness and speech content.

47. The method of claim 45 wherein the relevant audio stream is selected as the single audio output signal either by itself or admixed with other audio streams.

48. The method of claim 45 wherein the relevant audio stream is admixed with other audio streams to derive the single audio output signal.

49. The method of claim 43 further comprising judging the video streams according to the second set of criteria, the second set of criteria comprises one selected from a group consisting of degree of focus, camera motion, and presence of a participant in an image.

50. The method of claim 43 wherein one of the video streams is selected as the single video output signal.

51. The method of claim 50 .wherein the choosing comprises choosing as the selected video stream the one of the video streams that is determined to comprise an image of the participant providing a relevant audio stream.

52. The method of claim 50 further comprising processing the video streams to ascertain whether more than a predetermined minimum number of participants are viewing a same region, and if so the choosing comprises choosing as the selected video stream the one of the video stream that is determined to comprise an image of the region.

53. A system comprising:
- a computer-readable medium storing computer-readable instructions; and
- a data processor coupled to the memory, operable to execute the instructions, and based at least in part on the execution of the instructions operable to perform operations comprising
  - receiving contemporaneous audio streams,
  - receiving contemporaneous video streams,
  - selecting at least one of the audio streams according to a predetermined first set of one or more criteria,
  - choosing at least one of the video streams according to a predetermined second set of one or more criteria, wherein the choosing comprises determining at least one of the video streams that comprises an image of a source of audio content of the selected audio stream based on an image content based analysis of the video streams,
  - producing a single audio output signal from the at least one selected audio stream, and
  - generating a single video output signal from the at least one chosen video stream.

54. At least one machine-readable medium storing machine-readable instructions that, when executed by a machine, cause the a machine to perform operations comprising:
- receiving contemporaneous audio streams;
- receiving contemporaneous video streams;
- selecting at least one of the audio streams according to a predetermined first set of one or more criteria;
- choosing at least one of the video streams according to a predetermined second set of one or more criteria, wherein the choosing comprises determining at least one of the video streams that comprises an image of a source of audio content of the selected audio stream based on an image content based analysis of the video streams;
- producing a single audio output signal from the at least one selected audio stream; and
- generating a single video output signal from the at least one chosen video stream.

* * * * *